United States Patent [19]
Jolley et al.

[11] Patent Number: 5,966,481
[45] Date of Patent: Oct. 12, 1999

[54] OPTICALLY PUMPED OPTICAL WAVEGUIDE AMPLIFIER

[75] Inventors: Nigel Edward Jolley; Fiona Davis, both of Herts, United Kingdom

[73] Assignee: Northern Telecom Limited, Montreal, Canada

[21] Appl. No.: 08/996,865

[22] Filed: Dec. 23, 1997

[51] Int. Cl.⁶ .................................................... G02B 6/26
[52] U.S. Cl. ................... 385/28; 385/37; 372/6; 359/130; 359/341
[58] Field of Search ................... 385/11, 24, 28, 385/37; 372/6, 102; 359/341, 127, 130

[56] References Cited

U.S. PATENT DOCUMENTS

| | | | |
|---|---|---|---|
| 5,623,508 | 4/1997 | Grubb et al. | 372/3 |
| 5,740,292 | 4/1998 | Strasser | 385/37 |
| 5,768,012 | 6/1998 | Zanoni et al. | 359/341 |
| 5,892,615 | 4/1999 | Grubb et al. | 359/341 |

Primary Examiner—John D. Lee
Assistant Examiner—Victoria D. Hao
Attorney, Agent, or Firm—Lee, Mann, Smith, McWilliams, Sweeney and Ohlson

[57] ABSTRACT

An optically amplifying waveguide guides both the $LP_{01}$ and the $LP_{02}$ mode. Its erbium distribution profile is preferentially matched with the modal field distribution of the $LP_{02}$ mode. The waveguide is provided with long period perturbations of a pitch and strength that resonantly couples signal power of different wavelengths from propagation in the $LP_{01}$ mode to propagation in the $LP_{02}$ mode and back again to propagation in the $LP_{01}$ mode whereby the longitudinal distribution of gain along the waveguide at one wavelength is longitudinally displaced with respect to that at least one other wavelength.

24 Claims, 4 Drawing Sheets

OPTICALLY PUMPED OPTICAL WAVEGUIDE AMPLIFIER

BACKGROUND OF THE INVENTION

This invention relates to optically pumped optical waveguide amplifiers, such as erbium doped optical fibre waveguide amplifiers. When such amplifiers are used in cascade in a transmission system for amplifying wavelength division multiplexed (WDM) signals, problems are liable to be encountered that arise from the effects of differential spectral gain. Such differential gain effects can, if unchecked, lead to signal corruption at one or more wavelengths because the signal power at these wavelengths has become too small in relation to the signal power at one or more of the other wavelengths. The problems associated with limiting differential gain effects are compounded by the fact that the spectral gain characteristic of one of these amplifiers alters shape with changes in operating conditions. These problems can in principle be avoided by arranging for some form of passive equalisation to take place using saturation effects in an optical amplifier. What is required of such an amplifier is that strong input signals shall, through the effects of saturation, experience less amplification than weaker input signals. It has been shown that such an effect can be produced in an erbium doped optical fibre amplifier by cooling it to about 77K so that the erbium transition shall be predominantly inhomogenously broadened. However, at temperatures nearer room temperature, homogeneous broadening predominates, with the result that the gain spectrum saturates relatively uniformly even though the optical power in only one of the WDM channels is increased significantly over that of the others.

An alternative approach is described by M N Zervas and R I Laming in an article entitled 'Twin-Core Erbium Doped Channel Equalized', Journal of Lightwave Technology, Vol 13, No 5, May 1985, pp 721–731. Ideally one would wish for −1 dB/dB equalisation so that for every 1 dB of power difference between one input signal and another there would be −1 dB of relative gain. The twin-ore approach does not achieve this target but is able, under fully optimised conditions to achieve in excess of −0.4 dB/dB. This is achieved by the action of the twin core in producing a partial separation between the regions where light of one wavelength propagating in the guide experiences gain, and the region where light of another wavelength experiences it. What happen is that light is launched into a single one of its twin cores thereby exciting both the zero order mode and the first order mode. For any given wavelength, these propagate at different velocities, and so at various positions along the guide the optical power is concentrated in the vicinity of one the cores, while at various intermediate positions it is concentrated in the vicinity of the other core. These positions are different for different wavelengths.

SUMMARY OF THE INVENTION

The present invention is similarly directed to providing structures of optical waveguide amplifier having the property that the distribution of gain along the length of the waveguide is a function of wavelength of the light being amplified thereby affording such structures the potential for providing a measure of gain equalisation.

This functionality is provided by the use of a special configuration of optically amplifying waveguide that guides two different modes and furthermore has an active ion doping profile that registers with the modal field distribution of one of these modes to a significantly greater extent than it registers with that of the other. This doping profile therefore affords the waveguide with the property that it amplifies signals propagating in the one mode to a significantly greater extent (greater gain per unit length) than it amplifies signals propagating in the other mode. A further feature is that the waveguide is provided with long period grating perturbations that provide resonant coupling between the two modes so that optical signal power propagating in one of the modes is first converted into optical power propagating in the other mode, and then is converted back again into optical power propagating in the original mode. Resonant coupling occurs for a particular wavelength when the periodicity of the perturbations is matched with the beat length defined by the difference in propagation constants of the two modes for that wavelength. This beat length is itself in general a function of wavelength, and hence the pitch of the perturbations at any section along the length of the waveguide determines the wavelength that is coupled by that section. The perturbations may either take the form of a single monotonically chirped grating or it may be formed in discrete sections.

When the optical waveguide is an optical fibre waveguide, the long period grating perturbation can conveniently be made by the microstretching method of making a notch filter that is described in the specification of United kingdom Patent Application No GB 2 299 683A. This modification comprises producing the localised microstretching, not in single mode fibre, but in fibre that is capable of supporting two modes, and involves using a periodicity that corresponds to the beat length of these two guided modes instead of the beat length between the zero order guided modes and a higher order unguided (cladding) mode.

This way of providing the perturbations has the advantage of providing circular symmetry, and so, by choosing to couple between two modes that themselves are circularly symmetric, such as the fundamental linearly polarised mode, $LP_{01}$ and the next higher order linearly polarised mode, $LP_{02}$, a construction of amplifier is realisable which introduces substantially no polarisation dependent amplification effects. Moreover it is in a form in which the amplification can be readily be arranged to take place in a waveguide that has a structure that is capable of being readily and efficiently coupled with standard transmission-type single mode fibre, for instance by means of fused fibre tapered couplers.

Alternative ways of producing the requisite perturbations include creating index perturbations by localised exposure to intense ultraviolet light through the agency of the photorefractive effect.

Other features and advantages of the invention will be readily apparent from the following description of preferred embodiments of the invention, the drawings and the claims,

BRIEF DESCRIPTION OF THE DRAWINGS

Referring to FIG. 1, an amplifier embodying the invention in a preferred form is a co- and counter-pumped amplifier that has input and output terminals 10a and 10b, a pair of optical pump sources 11a and 11b, and a pair of pump wavelength/signal wavelength multiplexing couplers 12a and 12b. The wavelength multiplexing couplers 12a and 12b are constructed in conventional circularly symmetric signal mode transmission type optical fibre 13 that guides only the $LP_{01}$ mode. These couplers are optically coupled by fibre 14 which is special circularly symmetric fibre that guides not only the $LP_0$, mode but also the $LP_{02}$ mode. If the $LP_{01}$ modal spot sizes of the two fibres are sufficiently closely matched, the coupling of fibre 13 to fibre 14 may be effected by means of a simple butt-splice; if they are not such a good match, they may be coupled, as depicted in FIG. 1, by means of fused fibre tapered couplers 15a and 15b in which either fibre 13 or fibre 14, as appropriate, has been pre-tapered so that, in the coupling region, the $LP_{01}$ modes of the two fibres have matching propagation constants. Pre-tapering of this kind is for instance described in the specification of U.S. Pat. No 5,513,033. The pump light from sources 10a and 10b is launched into the $LP_{01}$ mode of fibre 13, and from there into the $LP_{01}$ of fibre 14. In fibre 14 this optical pump power is converted into power propagating in the $LP_{02}$ mode by means of wavelength selective mode converters 16a and 16b, which may conveniently be constituted by long period grating perturbations of a periodicity that produces resonant coupling between the $LP_{01}$ and $LP_{02}$ modes at the pump wavelength. These perturbations may be produced by the microstretching process to which previous reference has already been made. Another way of providing them is to produce them in the drawing process used for the original creation of the fibre from larger diameter fibre preform. Typically the beat length is of the order of 0.5 mm. The number of perturbations required to produce in the region of 100% coupling depends upon the absolute amount of microstretching produced at each perturbation, and is most easily and simply determined by trial and experiment.

The fibre 14 is not of uniform composition over its entire length. Only the central portion 14' that extends between a pair of butt splices 17a and 17b is doped with active ions, such as erbium ions, that provide optical amplification when optically pumped. However the real part of the refractive index profile is substantially the same, both in the part of the fibre 14 that is active ion doped and the parts that are not, so that optical power in both modes couples efficiently across both splices. Since the field of the $LP_{02}$ mode extends radially further than that of the $LP_{01}$ mode, the active ion doping profile is concentrated in an annular region arranged such that any power propagating in the $LP_{02}$ mode is amplified significantly more strongly than any power propagating in the $LP_{01}$ mode. The doped central portion 14' is provided with a long monotonically chirped period grating of perturbations 18, these preferably being created by the microstretching process to which previous reference has been made. The range of pitch variation of the perturbations is made broad enough to encompass the full range of $LP_{01}/LP_{02}$ beat lengths covered by the spectral range of the signal band within which the WDM channels to be amplified are located. The rate of chirp is chosen in relation to the depth of the perturbations so that power in each of the WDM channels is coupled either once, or two or more times, from the $LP_{01}$ mode into the $LP_{02}$ mode and substantially completely back into the $LP_{01}$ mode again. The ends of the grating may be apodised.

Figure 1:
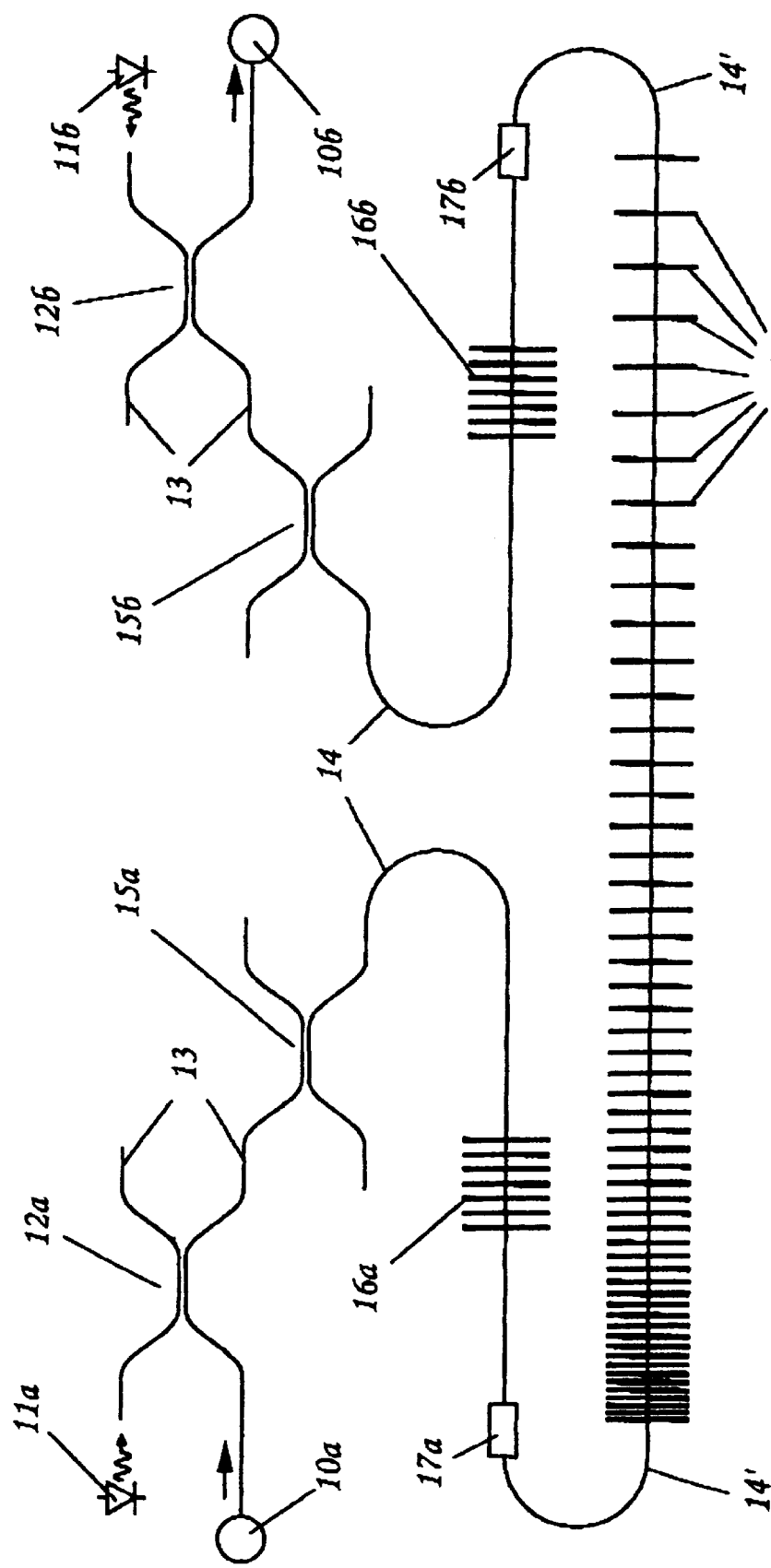
FIGS. 1 to 3 are schematic diagrams of amplifier that embody the invention in preferred forms that employ alternative formats of long period grating to effect mode conversion.
Figure 2:
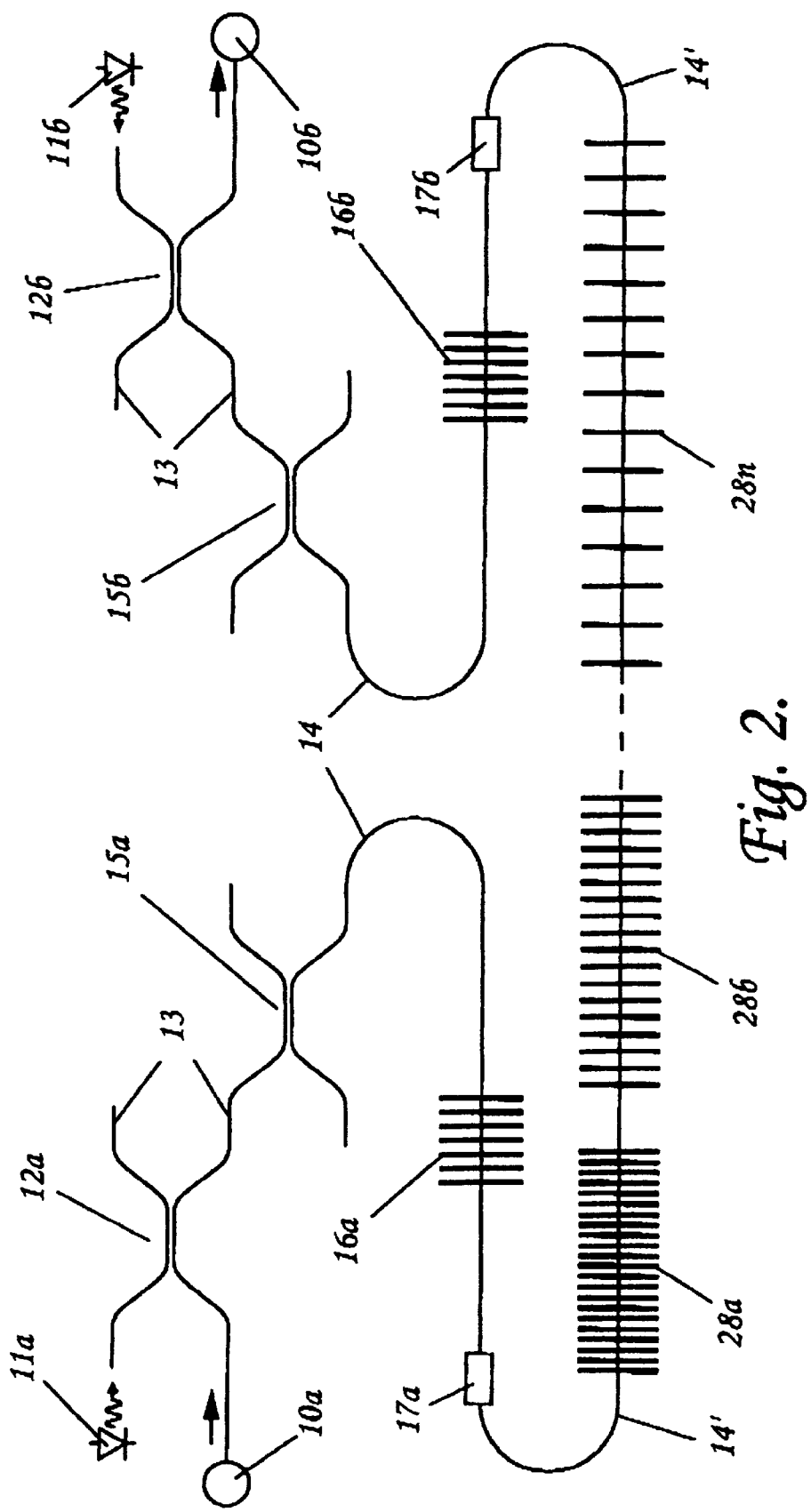

As an alternative to the use of a single chirped grating covering the full spectrum of all the channels a set of gratings may be used, one for each channel of sub-group of channels. Such a set is depicted in FIG. 2 where gratings 28a, 28b . . . 28n are substituted for the grating composed by the elements 18 of FIG. 1. In all other respects the components of the amplifier of FIG. 1 are identical with their counterparts in the amplifier of FIG. 1. Each of the gratings 20 of FIG. 2 similarly has the length and strength sufficient to effect one or more cycles of modal transfer from the $LP_{01}$ mode to the $LP_{02}$ mode and back again.

Figure 3:
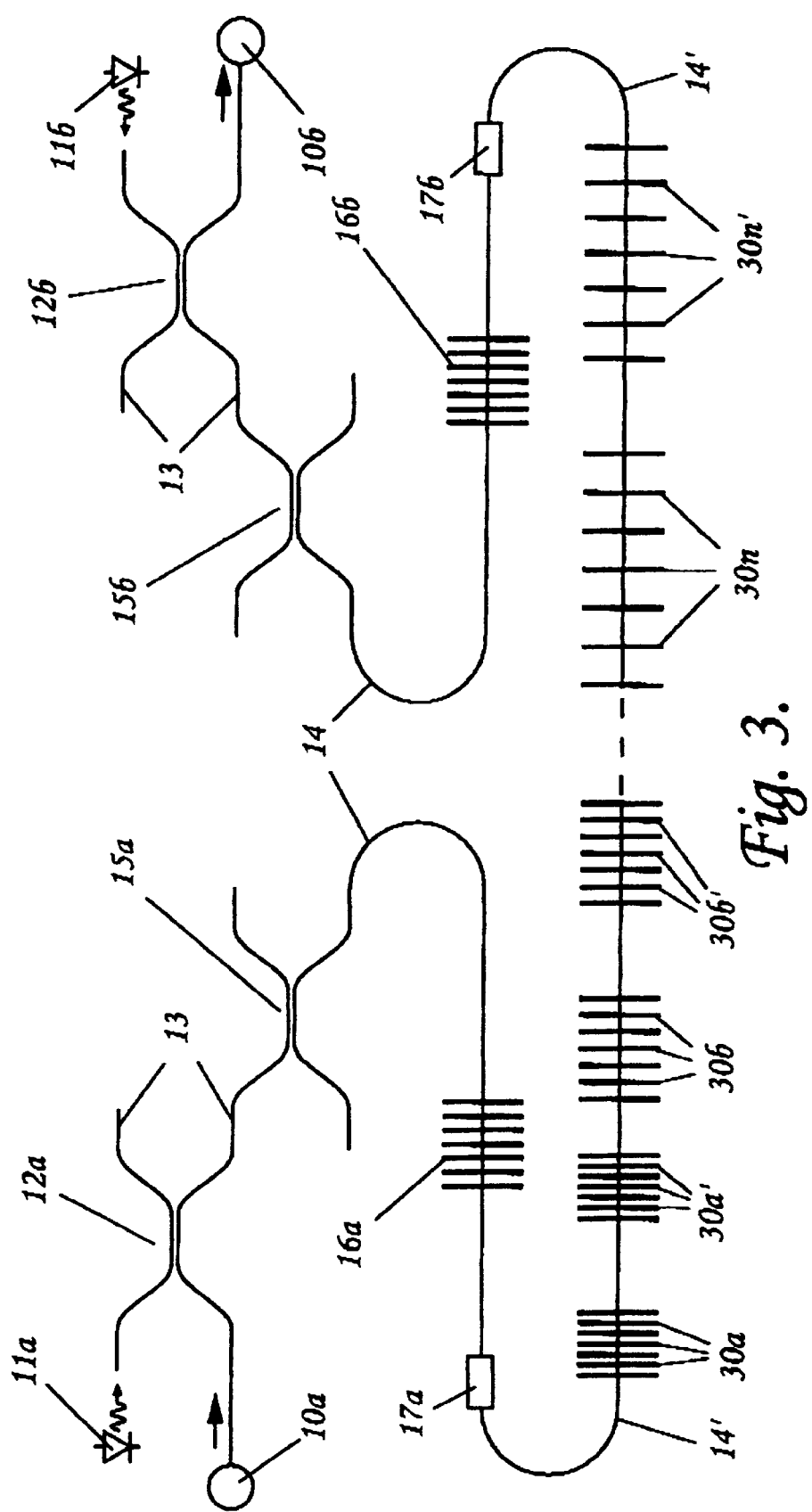

At least in principle it is possible to replace the individual gratings 20 of the amplifier of FIG. 2 with the pairs of gratings as depicted at 30a and 30a', 30b and 30b', and 30n and 30n' in FIG. 3. The first member of such a pair converts the relevant signal power from propagating in the $LP_{01}$ mode to power propagating in the $LP_{02}$ mode. This $LP_{02}$ mode power is then amplified by the length of fibre extending between the first member of the pair of gratings and the second. The second member of the pair then serves to convert the power back into propagating once again in the $LP_{01}$ mode. A potential drawback of this approach, as compared with that of the amplifier of FIG. 2, is that each grating of the latter automatically provides the requisite phase relationship between the modal conversion from $LP_{01}$ to $LP_{02}$ and that back again from $LP_{02}$ to $LP_{01}$. If the modal conversion effected by the first grating of a pair of gratings 30 of the amplifier of FIG. 3 were to leave a significant amount of power remaining in the $LP_{01}$ mode, then this will interfere with power that is converted back into power propagating in the $LP_{01}$ mode by the second grating of the pair. Under these circumstances the portion of fibre between the two gratings of the pair needs to be controlled to ensure stability of substantially constructive interference.

Figure 4:
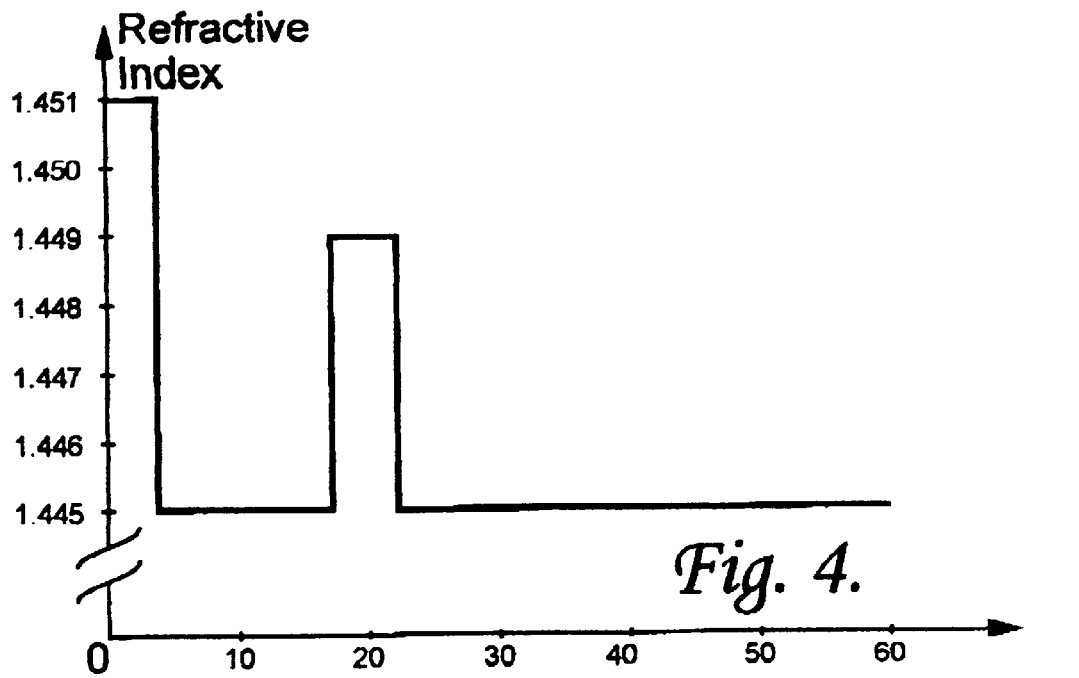
FIG. 4 is a graphical representation of a preferred form of refractive index profile for an optical fibre waveguide acting as the amplification medium of the amplifier of FIG. 1, 2 or 3.
Figure 5:
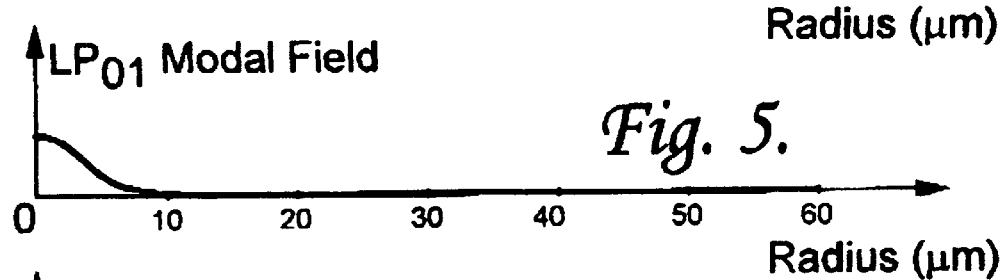
FIGS. 5 and 6 are graphical representations respectively of the $LP_{01}$ and $LP_{02}$ modes of the optical fibre of FIG. 4.
Figure 6:
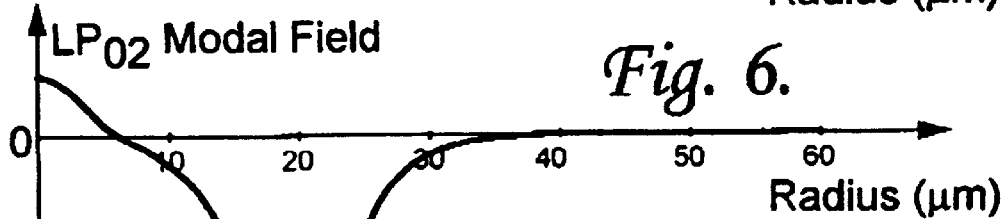
Figure 7:
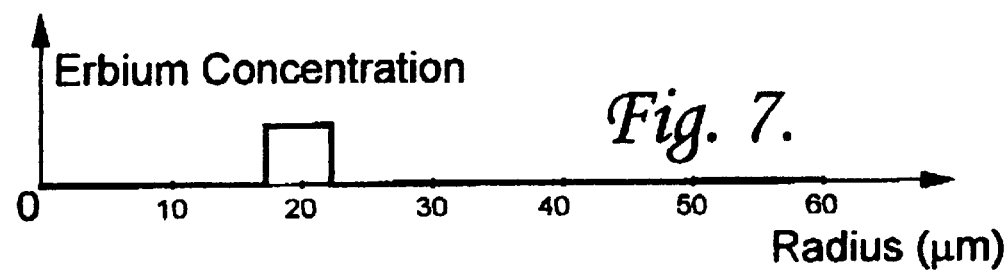
FIG. 7 is a graphical representation of the distribution of active optically amplifying ions within the fibre of FIG. 4.

A principal object of the present invention is to obtain a distribution of gain along the length of the amplifying waveguide (in the case of the embodiments of FIGS. 1, 2 and 3 a length of amplifying optical fibre waveguide 14') that is a function of signal wavelength whereby at least a partial longitudinal separation is effected between different regions amplifying different wavelengths. For an amplifier in which optical signal power is launched into its amplifying waveguide in some particular mode, mode A, and in which that power is transformed in a wavelength dependent manner to propagate in some other mode, mode B, and is then re-transformed back to propagate once again in mode A, the amount of separation depends in part upon the extent to which the amplification of power propagating in mode B exceeds that of power propagating in mode A. In respect of the particular instance of signal power being launched to propagate in the $LP_{01}$ mode and then of being transformed into and then out again of propagation in the $LP_{02}$ mode, a single step index profile, in which a central cylindrical core of a first refractive index is surrounded by an optical cladding of a second refractive index lower than the first, provides a structure in which the field distribution of the $LP_{02}$ mode extends radially further from the core axis than that of the $LP_{01}$ mode. Accordingly a measure of differential, and hence also of longitudinal separation of amplification, can be achieved in such a structure by providing it with an annular distribution of active amplifying ion dopant. In the case of a silica-based waveguide, such a dopant has the ancillary effect of raising the refractive index and so, unless the doping is accompanied by another dopant that depresses the refractive index, the annular distribution of active ions will also produce a corresponding annular region of raised refractive index, which will have the effect of enhancing the differential amplification of power propagating in the two modes. If desired, this can be further enhanced by the use of additional doping to augment the refractive index increment produced by the active ion doping. An example of such additional doping is given by the fibre amplifying fibre 14' whose refractive index profile is depicted in FIG. 4. This fibre has a 7.5 μm diameter central core of doped silica (typically germania doped silica) having a refractive index of 1.451, and has a 5 μm thick annular outer core of doped silica having a refractive index of 1.449 whose inner and outer radii are 17.5 μm and 22.5 μm respectively. The rest of the fibre is composed of undoped silica whose refractive index is 1.445 and/or of doped silica whose refractive index is matched with that of undoped silica. The modal field distributions of the $LP_{01}$ and $LP_{02}$ modes for a fibre with the refractive index profile of FIG. 4 are respectively depicted in FIGS. 5 and 6. Specifically it will be noted that, while the $LP_{01}$ field distribution has a peak that registers well with the annular core. Finally FIG. 7 shows that the active ion doping, erbium doping, is confined to the annular core.

The erbium doping profile described above with reference to FIG. 7 is an annular profile Different spectral components of the signal make a temporary excursion into propagation in the $LP_{02}$ mode at different distances along the optical fibre waveguide 14', and so there is at least some measure of spatial separation of the regions at which different spectral components are amplified. This affords at least some measure of gain equalisation.

A measure of gain equalisation can alternatively be obtained by choice of an on-axis erbium profile specifically designed to be overlapped to a significantly lesser extent by the $LP_{02}$ mode than by the $LP_{01}$ mode so that the differential ($LP_{02}$:$LP_{01}$) amplification is biased significantly in favour of amplification of the $LP_{01}$ mode. Under these circumstances different spectral components are temporarily coupled out of the $LP_{01}$ mode at different distances along the optical fibre waveguide. With the on-axis erbium profile, the amplification of such components is concentrated in regions in which the power is predominately propagating in the $LP_{01}$ mode. Accordingly the distribution of amplification along the optical fibre waveguide is different for different spectral components. This, in its turn, means that the distribution provides a measure of gain equalisation. Since the optical amplification is amplification of optical power propagating in the $LP_{01}$ mode, there is no particular advantage to be gained from launching this optical pump power into the amplifying optical fibre waveguide 14' in the form of power propagating in the $LP_{02}$ mode, and so it will generally be found preferable to launch the pump power into this fibre in the form of power propagating in the $LP_{01}$ mode.

We claim:

1. An optically amplifying waveguide that guides first and second modes respectively possessing first and second modal field distributions, which waveguide is provided with a spatial distribution of active optically amplifying dopant that registers more closely with the second modal field distribution that the first whereby to provide stronger amplification of the second mode than of the first, and which waveguide includes long period grating perturbations that induce resonant coupling between said first and second modes and are of a periodicity and strength such that, for at least two wavelengths that are amplified by the waveguide, optical power is coupled from propagating in one of said first and second modes to propagating in the other one of said first and second modes and back to propagating again in said one of said first and second modes.

2. An amplifying waveguide as claimed in claim 1, wherein said first and second modes are both circularly symmetric modes.

3. An amplifying waveguide as claimed in claim 2, wherein the amplifying waveguide is an optical fibre waveguide, and said first and second modes are selected from the group comprising the $LP_{01}$ mode and the $LP_{02}$ mode.

4. An amplifying waveguide as claimed in claim 1, wherein said one of said first and second modes is said first mode.

5. An amplifying waveguide as claimed in claim 4, wherein said amplifying waveguide is an optical fibre waveguide, and said first and second modes are respectively the $LP_{01}$ mode and the $LP_{02}$ mode.

6. An amplifying waveguide as claimed in claim 5, wherein the long period grating perturbations comprise a single monotonically chirped grating.

7. An optical amplifier for optically amplifying signals in a signal waveband, in which amplifier optical amplification is performed in an optical waveguide that guides first and second optical modes respectively possessing first and second modal field distributions, and which optical waveguide has a spatial distribution of active amplifying ion that registers with the first modal field distribution to a significantly lesser extent than with the second modal field distribution so as to provide significantly greater amplification of optical power propagating in the second mode than of that propagating in the first, and wherein the waveguide is provided with long period grating perturbations that effect resonant coupling of optical power of said signals in said waveguide from propagation in one of said first and second optical modes to propagation in the other of said first and second optical modes and back again to propagation in said one of said first and second optical modes.

8. An amplifying waveguide as claimed in claim 7, wherein said first and second modes are both circularly symmetric modes.

9. An amplifying waveguide as claimed in claim 8, wherein the amplifying waveguide is an optical fibre waveguide, and said first and second modes are selected from the group comprising the $LP_0$ mode and the $LP_{02}$ mode.

10. An amplifying waveguide as claimed in claim 7, wherein said one of said first and second modes is said first mode.

11. An amplifying waveguide as claimed in claim 10, wherein said amplifying waveguide is an optical fibre waveguide, and said first and second modes are respectively the $LP_{01}$ mode and the $LP_{02}$ mode.

12. An amplifying waveguide as claimed in claim 11, which amplifier includes at least one wavelength multiplexing coupler that incorporates a wavelength selective resonant mode converter which selectively converts optical pump power propagating in the $LP_{01}$ mode to optical pump power propagating in the $LP_{02}$ mode.

13. An amplifying waveguide as claimed in claim 12, wherein the long period grating perturbations comprise a single monotonically chirped grating.

14. In an optical transmission system having a plurality of WDM channels, a method of optically amplifying optical power propagating in said channels in a length of optically amplifying waveguide that guides first and second optical modes therein and that has a distribution of active optically amplifying ion concentration that provides, when optically pumped, significantly less gain to optical power propagating in one of said first and second optical modes than to optical power propagating in the other of said first and second optical modes, in which method optical pump power is coupled into the second mode of the waveguide, and optical power propagating in said WDM channels is launched into said optically amplifying waveguide in its first mode and is resonantly coupled by grating perturbations from said first mode into said second mode and back again to said first mode.

15. A method as claimed in claim 14, wherein said first and second modes are both circularly symmetric modes.

16. A method as claimed in claim 15, wherein the amplification is performed in optical fibre waveguide, and said first and second modes are respectively the $LP_{01}$ mode and the $LP_{02}$ mode.

17. A method as claimed in claim 14, wherein said resonant coupling is effected by perturbations forming a single monotonically chirped grating.

18. A method as claimed in claim 14, wherein the amplification is performed in waveguide that has the form of an optical fibre waveguide, and wherein each of said perturbations is created by a localised plastic microstretching of the fibre when in a temporarily heat-softened state.

19. A method of optical amplification in which gain is provided as the result of propagation of light through an optically amplifying waveguide, the longitudinal distribution of which gain is rendered wavelength dependent by inducing, in the waveguide, resonant coupling of the light from propagation in a first mode to propagation in a second mode and back again to propagation in the first mode wherein the waveguide is provided with spatial distribution of active optically amplifying dopant that affords a greater gain per unit length to one of said first and second modes than to the other.

20. A method as claimed in claim 19, wherein said one of said first and second modes is said second mode.

21. A method as claimed in claim 20, wherein said first and second modes are both circularly symmetric modes.

22. A method as claimed in claim 21, wherein the amplification is performed in optical fibre waveguide, and said first and second modes are respectively the $LP_{01}$ mode and the $LP_{02}$ mode.

23. A method as claimed in claim 22, wherein said resonant coupling is effected by perturbations forming a single monotonically chirped grating.

24. A method as claimed in claim 22, wherein the amplification is performed in waveguide that has the form of an optical fibre waveguide, and wherein the resonant coupling is effected by a set of long period grating perturbations each of which is created by a localised plastic microstretching of the fibre when in a temporarily heat-softened state.

* * * * *